US011571985B2

(12) United States Patent
Lee et al.

(10) Patent No.: US 11,571,985 B2
(45) Date of Patent: Feb. 7, 2023

(54) PARKING GUIDANCE SYSTEM OF PARKING LOT PROVIDED WITH CHARGING DEVICE FOR VEHICLE AND PARKING GUIDANCE METHOD USING THE SAME

(71) Applicants: HYUNDAI MOTOR COMPANY, Seoul (KR); KIA MOTORS CORPORATION, Seoul (KR)

(72) Inventors: Sang Heon Lee, Seoul (KR); Jin Ho Hwang, Seoul (KR); Dong Eun Cha, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 394 days.

(21) Appl. No.: 16/848,103

(22) Filed: Apr. 14, 2020

(65) Prior Publication Data

US 2021/0114480 A1    Apr. 22, 2021

(30) Foreign Application Priority Data

Oct. 16, 2019 (KR) ........................ 10-2019-0128485

(51) Int. Cl.
*B60L 53/00* (2019.01)
*B60L 53/66* (2019.01)
(Continued)

(52) U.S. Cl.
CPC .......... *B60L 53/665* (2019.02); *G06Q 20/145* (2013.01); *G06Q 30/0284* (2013.01); *G06V 20/62* (2022.01); *G08G 1/148* (2013.01)

(58) Field of Classification Search
CPC ........ B60L 53/665; B60L 53/36; B60L 53/38; G06Q 20/145; G06Q 30/0284;
(Continued)

(56) References Cited

U.S. PATENT DOCUMENTS 4,532,418 A * 7/1985 Meese ................... G06Q 20/127
  902/22
5,563,491 A * 10/1996 Tseng .................... B60L 53/665
  320/109
(Continued)

FOREIGN PATENT DOCUMENTS

GB           2302608 A  *  1/1997  ......... G06Q 30/0284
KR    10-2011-0004294 A     1/2011
(Continued)

OTHER PUBLICATIONS

KR20150098018A, Parking Guidance and Management System, English machine translation, 7 pages (Year: 2022).*
(Continued)

*Primary Examiner* — Tuyen K Vo
(74) *Attorney, Agent, or Firm* — Morgan, Lewis & Bockius LLP

(57) ABSTRACT

A parking guidance system of a parking lot includes: a first license plate number recognizing device recognizing a license plate number of a vehicle entering or exiting from a parking lot; and a server classifying a priority of the vehicle and distinguishing whether the vehicle is a parking or charging use vehicle based on the license plate number, assigning a parking or charging spot based on at least one of the classified priority, information on whether the vehicle is the parking use vehicle or the charging use vehicle, or information on remaining parking spots and remaining charging spots, providing a guidance on a position of the assigned parking spot or charging spot to the vehicle until the vehicle arrives at the position, and determining a parking fee or a charging fee of the vehicle and providing a guidance on the fee when the vehicle exits the parking lot.

14 Claims, 5 Drawing Sheets

(51) Int. Cl.
  *G06Q 30/02* (2012.01)
  *G06Q 20/14* (2012.01)
  *G08G 1/14* (2006.01)
  *G06V 20/62* (2022.01)

(58) Field of Classification Search
  CPC .... G06Q 20/4014; G06Q 50/30; G06V 20/62;
       G06V 20/625; G06V 20/52; G08G 1/148;
       G08G 1/142; G08G 1/146; G08G 1/149;
       G08G 1/017; G07F 17/24; Y02T 10/70;
       Y02T 10/7072; Y02T 90/12; Y02T 90/16;
       Y02T 90/167; Y04S 30/14
  See application file for complete search history.

(56) References Cited

U.S. PATENT DOCUMENTS

| | | | | |
|---|---|---|---|---|
| 6,771,185 B1* | 8/2004 | Yoo | .................... | G06Q 30/0284 340/955 |
| 6,970,101 B1* | 11/2005 | Squire | ..................... | G08G 1/14 705/13 |
| 10,723,230 B2* | 7/2020 | Mastrandrea | ...... | G06Q 30/0639 |
| 2003/0144890 A1* | 7/2003 | Dan | ....................... | G06Q 30/02 705/5 |
| 2012/0271758 A1* | 10/2012 | Jammer | .................. | B60L 53/68 701/22 |
| 2013/0002197 A1* | 1/2013 | Hernandez | .............. | B60L 53/67 320/109 |
| 2015/0235148 A1* | 8/2015 | Chen | .................... | G06Q 20/127 705/5 |
| 2016/0167538 A1* | 6/2016 | Kim | ...................... | B60L 53/665 320/109 |
| 2020/0311623 A1* | 10/2020 | Noguchi | ......... | B60W 60/00253 |
| 2020/0387840 A1* | 12/2020 | Noguchi | ......... | G08G 1/096725 |

FOREIGN PATENT DOCUMENTS

| KR | 10-2015-0098018 A | 8/2015 |
|---|---|---|
| KR | 10-1942153 B1 | 1/2019 |
| KR | 10-1964059 B1 | 4/2019 |

OTHER PUBLICATIONS

KR101942153B1, Fare Calculating and Imposition System Based on Parking and Electric Charging Information, English machine translation, 5 pages (Year: 2022).*

Korean Office Action dated Sep. 12, 2020 issued in Korean Patent Application No. 10-2019-0128485.

* cited by examiner

PARKING GUIDANCE SYSTEM OF PARKING LOT PROVIDED WITH CHARGING DEVICE FOR VEHICLE AND PARKING GUIDANCE METHOD USING THE SAME

CROSS REFERENCE TO RELATED APPLICATION

The present application claims the benefit of priority to Korean Patent Application No. 10-2019-0128485, filed on Oct. 16, 2019, the entire contents of which is incorporated herein for all purposes by this reference.

TECHNICAL FIELD

The present disclosure relates to a parking guidance system of a parking lot provided with a charging device for a vehicle and a parking guidance method using the same, and more particularly, to a parking guidance system of a parking lot provided with a charging device dedicated to an electric vehicle in a predetermined ratio or more among parking spots of the parking lot, and a parking guidance method using the same.

BACKGROUND

Recently, technologies for environmentally friendly vehicles including a hybrid vehicle, an electric vehicle, and a fuel cell vehicle have been actively developed.

Meanwhile, a conventional electric vehicle should move to a specific place where a charging station is installed in order to charge a battery, and the battery should be charged for 20 to 60 minutes in the charging station. When the battery is slowly charged in the charging station, it takes several hours to charge the battery, which is inconvenient to a user. In addition, there was a limitation that a large space is required in order to install a charging facility. In addition, a conventional parking lot provides only a guidance on information on the remaining parking spots, and does not provide a path to an available parking spot, such that a driver has significant inconvenience in finding the available parking spot.

The above information disclosed in this Background section is only for enhancement of understanding of the background of the present disclosure, and should not be taken as acknowledgement that this information forms the prior art that is already known to a person skilled in the art.

SUMMARY

One object of the present disclosure is to provide a parking guidance system of a parking lot, provided with a charging device for a vehicle, capable of allowing a driver to more easily use a parking or charging service by assigning a remaining parking spot or charging spot when the vehicle enters the parking lot provided with charging devices for a vehicle in a predetermined ratio or more among parking spots of the parking lot and by providing a guidance on a path to the assigned parking spot or charging spot, and a parking guidance method using the same.

According to an exemplary embodiment of the present disclosure, a parking guidance system of a parking lot provided with a charging device for a vehicle includes: a first license plate number recognizing device recognizing a license plate number of a vehicle entering or exiting from the parking lot; and a server classifying a priority of the vehicle and distinguishing whether the vehicle is a parking use vehicle or a charging use vehicle based on the license plate number recognized by the first license plate number recognizing device, assigning a parking spot or a charging spot based on at least one of information on the classified priority, information on whether the vehicle is the parking use vehicle or the charging use vehicle, or information on remaining parking spots and remaining charging spots, providing a guidance on a position of the assigned parking spot or charging spot to the vehicle until the vehicle arrives at the position of the assigned parking spot or charging spot, and determining a parking fee or a charging fee of the vehicle and providing a guidance on the parking fee or the charging fee when the vehicle exits the parking lot.

The server may include at least one of: a database device storing parking/charging service use reserved vehicle information, regular parked vehicle information, and information on whether the charging use vehicle is a fast charging use vehicle or a slow charging use vehicle; a priority classifying device deciding whether the vehicle is a regular parked vehicle, a parking/charging service use reserved vehicle, or a parking/charging service use unreserved vehicle based on the license plate number recognized by the first license plate number recognizing device and the information pre-stored in the database device and then classifying the priority of the vehicle; a parking/charging use distinguishing device distinguishing whether the vehicle is the parking use vehicle or the charging use vehicle based on the license plate number recognized by the first license plate number recognizing device and the information pre-stored in the database device and distinguishing whether the charging use vehicle is the fast charging use vehicle or the slow charging use vehicle when the vehicle is the charging use vehicle; a path guiding device assigning the parking spot or the charging spot based on the priority of the vehicle and information distinguished by the parking/charging use distinguishing device and providing a guidance on a path to the vehicle until the vehicle arrives at the assigned spot; a payment device determining the parking fee or the charging fee of the vehicle and processing payment of the fee; a charging completion guiding device providing a guidance on whether or not charging of the vehicle is completed to a user terminal; or a reserving device processing a parking or charging service reservation based on reservation information input from the user terminal.

The parking guidance system of a parking lot provided with a charging device for a vehicle may further include one or more displays displaying a path of the vehicle to the assigned parking spot or charging spot, wherein the path guiding device transfers information on the path of the vehicle to the assigned parking spot or charging spot to the displays to allow the information on the path to be displayed on the displays.

When a preset time elapses after the charging of the vehicle is completed, the payment device may determine a separate parking fee and process payment of the separate parking fee when the vehicle exits the parking lot.

The reserving device may perform reservation completion processing when the reservation information and card information for processing payment of a deposit for use of a parking or charging service is input from the user terminal.

The reservation information may include a use date of the parking or charging service, a use time of the parking or charging service, and a license plate number.

The payment device may perform processing so that the deposit is paid by the card information input to the reserving device when a reserved vehicle is not recognized by the first license plate number recognizing device for a preset time based on a use reserved time of a reserved service date.

The parking guidance system of a parking lot provided with a charging device for a vehicle may further include a charging device installed in a partial space of the parking slot, wherein the charging device includes: a parking prevention jaw including a charging device, movable upward or downward, protruding upward based on a ground to disable the vehicle from being parked at the time of moving upward, and being positioned below the ground to enable the vehicle to be parked at the time of moving downward; a second license plate number recognizing device provided in the parking prevention jaw and recognizing a license plate number; and a controller comparing the license plate number recognized by the second license plate number recognizing device with the license plate number recognized by the first license plate number recognizing device, and moving the parking prevention jaw downward to enable the vehicle to be parked when the license plate numbers coincide with each other and allowing the parking prevention jaw to be maintained in a state where the parking prevention jaw protrudes upward based on the ground when the license plate numbers do not coincide with each other.

According to another exemplary embodiment of the present disclosure, a parking guidance method using a parking guidance system of a parking lot provided with a charging device for a vehicle includes steps of: recognizing a license plate number by a first license plate number recognizing device when the vehicle enters the parking lot; classifying a priority of the vehicle and distinguishing whether the vehicle is a parking use vehicle or a charging use vehicle based on the recognized license plate number; assigning a parking spot or a charging spot based on at least one of information on the classified priority, information on whether the vehicle is the parking use vehicle or the charging use vehicle, or information on remaining parking spots and remaining charging spots; providing a guidance on a position of the assigned parking spot or charging spot to the vehicle until the vehicle arrives at the position of the assigned parking spot or charging spot; and determining a parking fee or a charging fee of the vehicle and processing payment of the parking fee or the charging fee when the vehicle exits the parking lot.

The step of classifying may include deciding whether the vehicle is a regular parked vehicle, a parking/charging service use reserved vehicle, or a parking/charging service use unreserved vehicle based on the license plate number recognized by the first license plate number recognizing device, and classifying the priority of the vehicle.

The step of classifying includes distinguishing whether the charging use vehicle is a fast charging use vehicle or a slow charging use vehicle when the vehicle is the charging use vehicle.

The parking guidance method may further include, after the step of providing, recognizing a license plate number by a second license plate number recognizing device; and comparing the license plate number recognized by the second license plate number recognizing device with the license plate number recognized by the first license plate number recognizing device, and moving a parking prevention jaw downward to enable the vehicle to be parked when the license plate numbers coincide with each other and allowing the parking prevention jaw to be maintained in a state where the parking prevention jaw protrudes upward based on a ground when the license plate numbers do not coincide with each other.

The step of determining includes determining a separate parking fee and processing payment of the separate parking fee when the vehicle exits the parking lot.

The parking guidance method may further include, before the step of recognizing, processing a parking or charging service reservation based on reservation information input from a user terminal.

The processing a parking or charging service reservation based on the reservation information input from a user terminal includes performing reservation completion processing when the reservation information and card information for processing payment of a deposit for use of a parking or charging service is input from the user terminal.

The parking guidance method may further include performing processing so that a deposit is paid by card information input to a reserving device when a reserved vehicle is not recognized by the first license plate number recognizing device for a preset time based on a use reserved time of a reserved service date.

DETAILED DESCRIPTION

Hereinafter, the present disclosure will be described in detail with reference to the drawings. Terms and words used in the present specification and claims are not to be construed as a general or dictionary meaning, and are to be construed as meaning and concepts meeting the technical ideas of the present disclosure based on a principle that the inventors may appropriately define the concepts of terms in order to describe their own inventions in the best mode.

Therefore, configurations described in exemplary embodiments and the accompanying drawings of the present specification are only the most preferable embodiment of the present disclosure, and do not represent all of the technical spirits of the present disclosure. Therefore, it should be understood that there may be various equivalents and modifications capable of substituting for the present disclosure at the time of filing the present disclosure.

Figure 1:
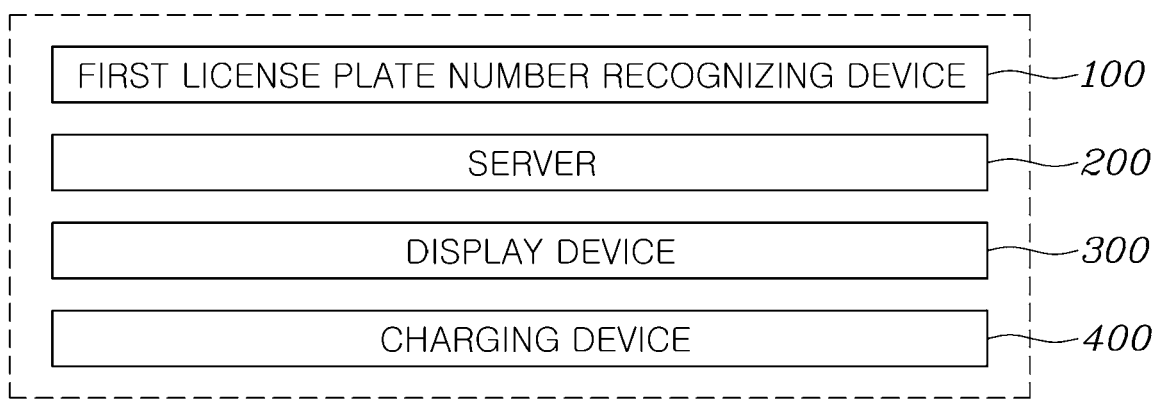
FIG. 1 is a view schematically illustrating an entire configuration of a parking guidance system of a parking lot provided with a charging device for a vehicle according to an exemplary embodiment of the present disclosure.

FIG. 1 is a view schematically illustrating an entire configuration of a parking guidance system of a parking lot provided with a charging device for a vehicle according to an exemplary embodiment of the present disclosure. As illustrated in FIG. 1, the parking guidance system of a parking lot provided with a charging device for a vehicle according to an exemplary embodiment of the present disclosure may be configured to include a first license plate number recognizing device 100, a server 200, a display 300, and a charging device 400.

The first license plate number recognizing device 100 serves to recognize a license plate number of a vehicle entering or exiting from a parking lot. According to an exemplary embodiment, the first license plate number recognizing device 100 may be, for example, a camera, an image sensor, etc. A technology of recognizing the license plate number of the vehicle through the camera is a known technology, and a detailed description therefor is thus omitted.

The server 200 may classify a priority of the vehicle based on the license plate number recognized by the first license plate number recognizing device 100, and distinguish whether the vehicle is a parking use vehicle or a charging use vehicle. In addition, the server 200 may assign a parking spot or a charging spot based on one or more information of information on the classified priority, the information on whether the vehicle is the parking use vehicle or the charging use vehicle, and information on the remaining parking spots and the remaining charging spots, and provide a guidance on a position of the assigned parking spot or charging spot to the vehicle until the vehicle arrives at the position of the assigned parking spot or charging spot. In addition, the server 200 may determine a parking fee or a charging fee of the vehicle and provide a guidance on the fee when the vehicle exits the parking lot. Hereinafter, detailed components of the server 200 and roles of each detailed component will be described in detail.

Figure 2:
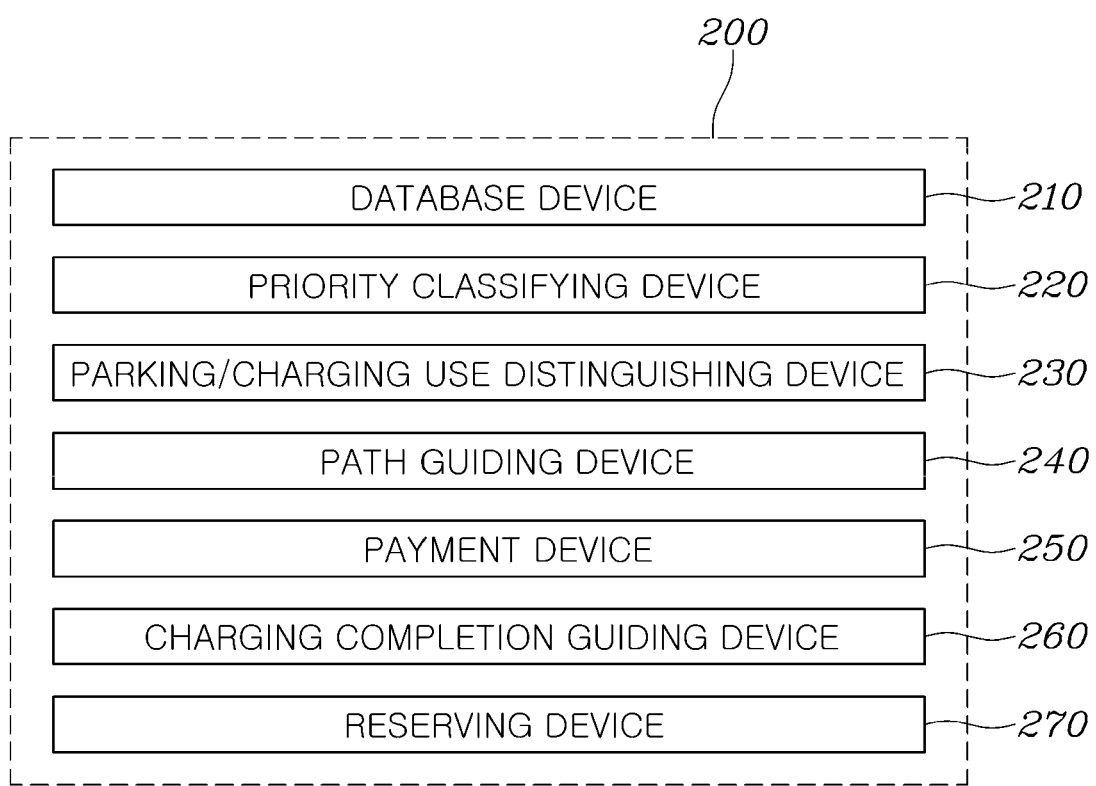
FIG. 2 is a view schematically illustrating a configuration of a server of the parking guidance system of a parking lot provided with a charging device for a vehicle according to an exemplary embodiment of the present disclosure.

As illustrated in FIG. 2, the server 200 may include a database device 210, a priority classifying device 220, a parking/charging use distinguishing device 230, a path guiding device 240, a payment device 250, a charging completion guiding device 260, and a reserving device 270. The server 200 may be a computer system including one or more processors on a network and associated non-transitory memories storing instructions of software which, when executed by the processors, provide functionalities of the database device 210, the priority classifying device 220, the parking/charging use distinguishing device 230, the path guiding device 240, the payment device 250, the charging completion guiding device 260, and the reserving device 270 of the server 200. Various functions of these devices 210 to 270 are described hereinafter.

Specifically, the database device 210 of the server 200 may store parking/charging service use reserved vehicle information, regular parked vehicle information, and information on whether a charging use vehicle is a fast charging use vehicle or a slow charging use vehicle. Here, the parking/charging service use reserved vehicle information may be license plate number information of a vehicle performing reservation in order to use a parking service or a charging service through a reserving device 270 to be described below. In addition, the regular parked vehicle information may be license plate number information of a resident who lives in an apartment, a building, a public institution building, or the like, including a parking lot to perform regular parking in the parking lot according to an exemplary embodiment. The abovementioned information stored in the database device 210 may be used to classify the priority of the vehicle together with the license plate number recognized by the first license plate number recognizing device 100 in a priority classifying device 220 to be described below.

The database device 210 may include at least one type of storage medium among a flash memory type, a hard disk type, a multimedia card micro type such as an SD or XD memory, a random access memory (RAM), a static RAM (SRAM), a read-only memory (ROM), an electrically erasable programmable read-only memory (EEPROM), a programmable read-only memory (PROM), a magnetic memory, a magnetic disk, an optical disk, etc.

The priority classifying device 220 of the server 200 serves to decide whether the vehicle is a regular parked vehicle, a parking/charging service use reserved vehicle, or a parking/charging service use unreserved vehicle based on the license plate number recognized by the first license plate number recognizing device 100 and the information pre-stored in the database device 210 and then classify the priority of the vehicle. As described above, since the parking/charging service use reserved license plate number information and the regular parked license plate number information are stored in the database device 210, the priority classifying device 220 may compare the license plate number recognized by the first license plate number recognizing device 100 with a license plate number pre-stored in the database device 210 to decide whether the vehicle is the regular parked vehicle, the parking/charging service use reserved vehicle, or the parking/charging service use unreserved vehicle, and then classify the priority of the vehicle. According to an exemplary embodiment, the priority classifying device 220 may classify the regular parked vehicle as a first priority, classify the parking/charging service use reserved vehicle as a second priority, and classify the parking/charging service use unreserved vehicle as a third priority. The priority of the vehicle classified by the priority classifying device 220 as described above may be used to assign a parking spot or a charging spot of the vehicle in a path guiding device 240 to be described below. This will be described again at the time of describing a path guiding device 240 later.

The parking/charging use distinguishing device 230 of the server 200 serves to distinguish whether the vehicle is the parking use vehicle or the charging use vehicle based on the license plate number recognized by the first license plate number recognizing device 100 and the information pre-stored in the database device 210, and distinguish whether the charging use vehicle is the fast charging use vehicle or the slow charging use vehicle when the vehicle is the charging use vehicle. The parking/charging use distinguishing device 230 may compare the license plate number recognized by the first license plate number recognizing device 100 with the license plate number pre-stored in the database device 210 and distinguish whether the charging use vehicle is the fast charging use vehicle or the slow charging use vehicle when the vehicle is the charging use vehicle.

The path guiding device 240 of the server 200 serves to assign a parking spot or a charging spot based on information classified by the priority classifying device of the vehicle and distinguished by the parking/charging use distinguishing device of the vehicle, and provide a guidance on a path to the vehicle until the vehicle arrives at the assigned spot. According to an exemplary embodiment, the path guiding device 240 may assign the vehicle classified as the first priority to a parking spot or a charging spot closest to an elevator, assign the vehicle classified as the second priority to a parking spot or a charging spot more distant from the elevator as compared with the vehicle classified as the first priority, and assign the vehicle classified as the third priority to a parking spot or a charging spot more distant from the elevator as compared with the vehicle classified as the second priority based on the information classified by the priority classifying device of the vehicle and distinguished by the parking/charging use distinguishing device of the vehicle.

Figure 3:
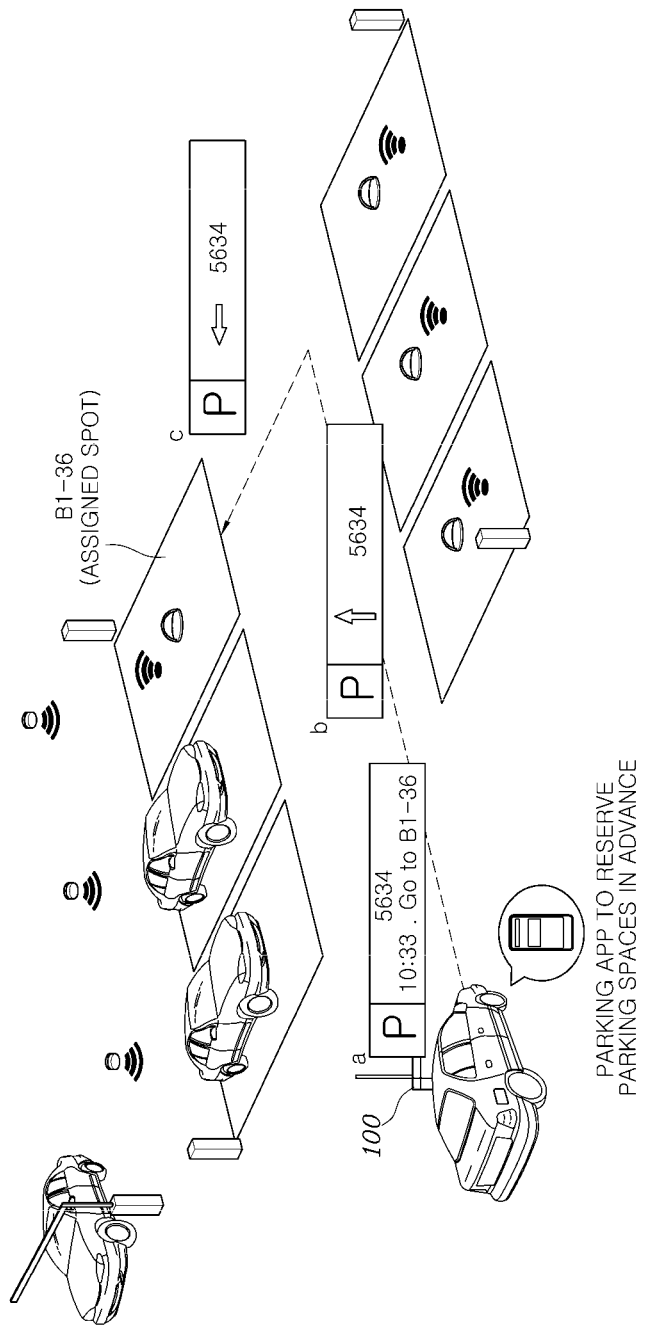
FIG. 3 is a view illustrating that path guidance to an assigned parking spot is provided to a vehicle in the parking guidance system of a parking lot provided with a charging device for a vehicle according to an exemplary embodiment of the present disclosure.

In addition, when the path guiding device 240 assigns the parking spot or the charging spot of the vehicle, the path guiding device 240 may provide a guidance on a path to the vehicle until the vehicle arrives at the assigned spot. According to an exemplary embodiment, the path guiding device 240 may perform communication with the parking lot and the vehicle to confirm a position of the vehicle and indicate a direction on a movement path through which the vehicle is to move to the assigned spot. For example, referring to FIG. 3, when the vehicle passes through points a, b, and c until the vehicle arrives at the assigned spot, the path guiding device 240 may provide a guidance on a path moving direction of the vehicle at the point b with an arrow or the like when the vehicle passes through the point a and provide a guidance on a path moving direction of the vehicle at the point c with an arrow or the like when the vehicle passes through the point b, thereby providing a guidance on the path until the vehicle arrives at the assigned spot.

According to an exemplary embodiment, the path guiding device 240 may transfer path guiding information of the vehicle to a plurality of displays 300 installed in the parking lot to allow a path guidance to be displayed on the displays 300. According to another exemplary embodiment, the path guiding device 240 may transfer path guiding information of the vehicle to a navigation device, a head-up display, or the like, of the vehicle to allow the path to be displayed on the navigation device, the head-up display, or the like.

The payment device 250 of the server 200 serves to determine a parking fee or a charging fee of the vehicle and process payment of the fee. Specifically, the payment device 250 may determine the parking fee or the charging fee of the vehicle based on a preset fee, and process payment of the fee when the vehicle exits the parking lot. In addition, when a preset time elapses after the charging of the vehicle is completed, the payment device 250 may determine a separate parking fee, and process payment of the separate parking fee when the vehicle exits the parking lot. In other words, according to an exemplary embodiment, when the charging service use vehicle does not exist from the parking lot for a preset time even though the charging of the vehicle is completed, the payment device 250 may determine the separate parking fee, and process the payment of the separate parking fee when the vehicle exits the parking lot.

The charging completion guiding device 260 of the server 200 serves to provide a guidance on whether or not the charging of the vehicle is completed to a user terminal. According to an exemplary embodiment, the charging completion guiding device 260 may transmit a charging completion scheduled message to the user terminal of the user who is using the charging of the vehicle, 30 minutes before the charging is completed. However, this is only an example and a time at which a charging completion guiding message is transmitted may be changed.

The reserving device 270 of the server 200 serves to process a parking or charging service reservation based on reservation information input from the user terminal. Here, the reservation information input from the user terminal may include a use date of the parking or charging service, a use time of the parking or charging service, a license plate number, and the like. In addition, the reserving device 270 may perform reservation completion processing when card information for processing payment of a deposit for the use of the parking or charging service is input together with the reservation information described above from the user terminal.

Meanwhile, the payment device 250 may perform processing so that the deposit is paid by the card information input to the reserving device 270 when a reserved vehicle is not recognized by the first license plate number recognizing device for a preset time based on a use reserved time of a service date reserved through the reserving device 270.

The display 300 serves to display the path of the vehicle to the assigned parking spot or charging spot. The display 300 may be a plurality of electronic display boards or the like provided in the parking lot according to an exemplary embodiment, or may be a navigation device, a head-up display or the like provided in the vehicle according to another exemplary embodiment. The display 300 may display vehicle path information to the assigned parking spot or charging spot transferred from the path guiding device 240 to allow a driver to easily arrive at the assigned parking spot or charging spot.

Figure 4:
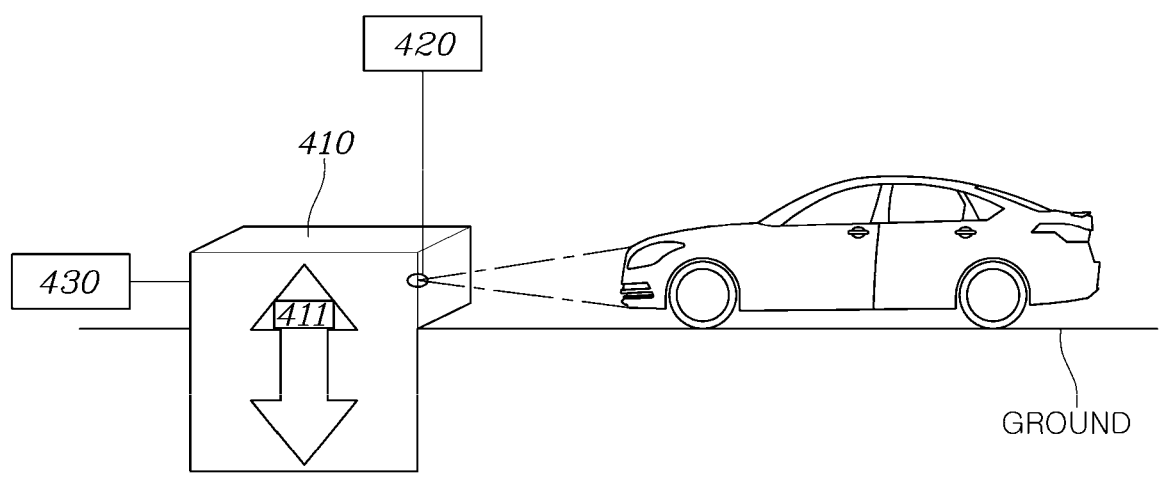
FIG. 4 is a view illustrating a configuration of a charging device of the parking guidance system of a parking lot provided with a charging device for a vehicle according to an exemplary embodiment of the present disclosure.

The charging device 400, which is installed in a partial space of the parking slot of the parking lot, serves to charge a battery of an electric vehicle, and may include a parking prevention jaw 410, a second license plate number recognizing device 420, and a controller 430. According to an exemplary embodiment, the charging device 400 may be a wireless charging pad charging device as illustrated in FIG. 4.

Specifically, the parking prevention jaw 410 includes a charging device 411 and may move upward or downward. When the parking prevention jaw 410 moves upward, the parking prevention jaw 410 may protrude upward based on the ground to disable the vehicle from being parked, and when the parking prevention jaw 410 moves downward, the parking prevention jaw 410 is positioned below the ground to enable the vehicle to be parked. Here, the parking prevention jaw 410 is controlled by a controller 430 to be described below, and when the parking prevention jaw 410 moves downward, the charging device 411 may be activated to allow the parked vehicle to be charged.

The second license plate number recognizing device 420 is provided in the parking prevention jaw 410, and serves to recognize a license plate number. According to an exemplary embodiment, the second license plate number recognizing device 420 may be, for example, a camera, an image sensor, etc.

The controller 430 may compare the license plate number recognized by the second license plate number recognizing device 420 with the license plate number recognized by the first license plate number recognizing device 100, and move the parking prevention jaw 410 downward to enable the vehicle to be parked when the license plate numbers coincide with each other and allow the parking prevention jaw 410 to be maintained in a state where the parking prevention jaw 410 protrudes upward based on the ground to disable the vehicle from being parked when the license plate numbers do not coincide with each other. In addition, the controller 430 may compare the license plate number recognized by the second license plate number recognizing device 420 with the license plate number recognized by the first license plate number recognizing device 100, and move the parking prevention jaw 410 downward and activate the charging device 411 to allow the vehicle to be charged when the license plate numbers coincide with each other.

The controller according to an exemplary embodiment of the present disclosure may be implemented through a non-volatile memory (not illustrated) configured to store an algorithm configured to control operations of various components of the charging device or data on software instructions reproducing the algorithm and a processor (not illustrated) configured to perform the operations described above using the data stored in the nonvolatile memory. Here, the memory and the processor may be implemented as individual chips. Alternatively, the memory and the processor may be integrated with each other and implemented as a single chip. The processor may have a form of one or more processors.

Figure 5:
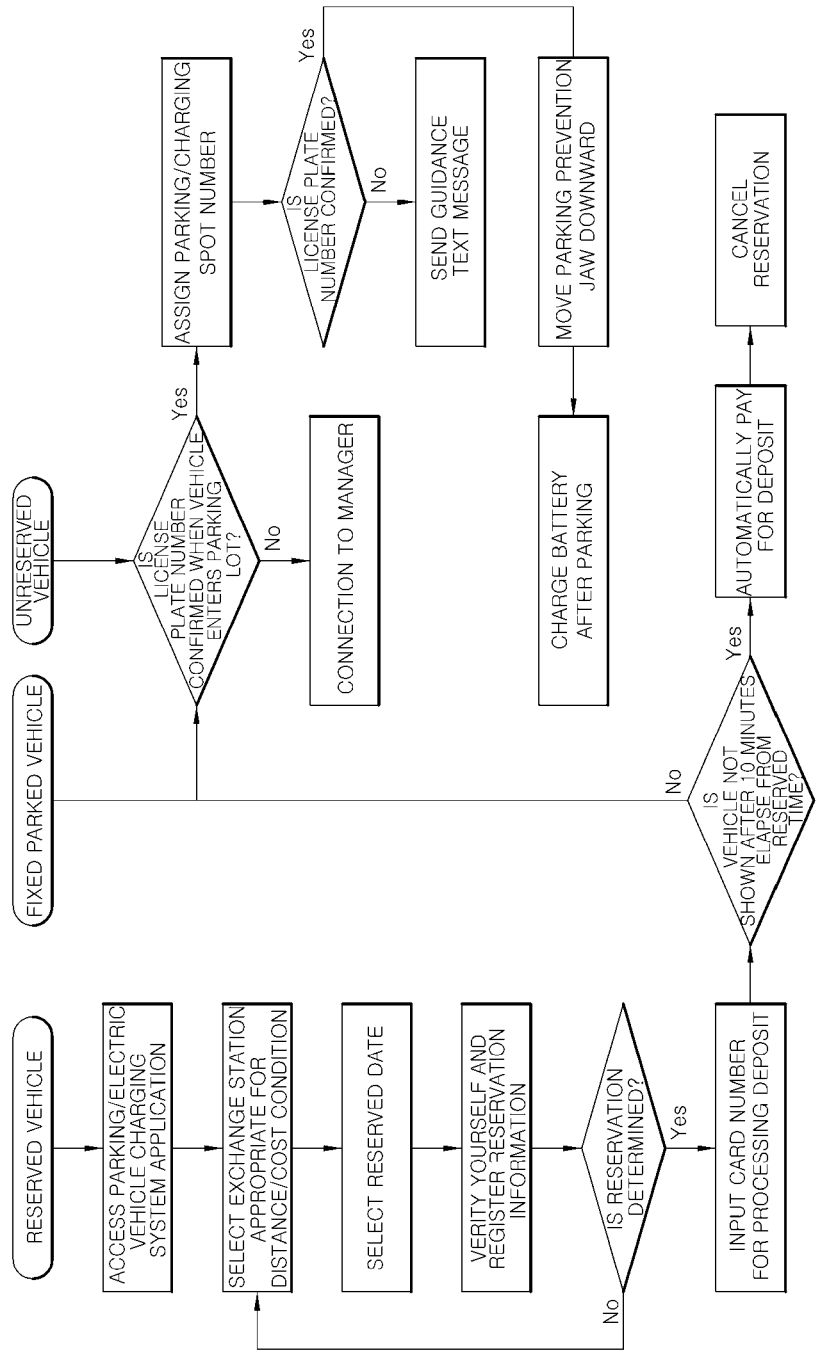
FIG. 5 is a flow chart illustrating a parking guidance method using the parking guidance system of a parking lot provided with a charging device for a vehicle according to an exemplary embodiment of the present disclosure.

FIG. 5 is a flow chart illustrating a parking guidance method using the parking guidance system of a parking lot provided with a charging device for a vehicle according to an exemplary embodiment of the present disclosure. Referring to FIG. 5, the parking guidance method using a parking guidance system of a parking lot provided with a charging device for a vehicle according to an exemplary embodiment of the present disclosure may include recognizing the license plate number by the first license plate number recognizing device when the vehicle enters the parking lot, classifying the priority of the vehicle and distinguishing whether the vehicle is the parking use vehicle or the charging use vehicle based on the recognized license plate number, assigning the parking spot or the charging spot based on one or more information of the information on the classified priority, the information on whether the vehicle is the parking use vehicle or the charging use vehicle, and the information on the remaining parking spots and the remaining charging spots, providing the guidance on the position of the assigned parking spot or charging spot to the vehicle until the vehicle arrives at the position of the assigned parking spot or charging spot, and determining the parking fee or the charging fee of the vehicle and processing payment of the parking fee or the charging fee when the vehicle exits the parking lot.

Specifically, in the classifying of the priority of the vehicle and the distinguishing of whether the vehicle is the parking use vehicle or the charging use vehicle based on the recognized license plate number, it may be decided whether the vehicle is the regular parked vehicle, the parking/charging service use reserved vehicle, or the parking/charging service use unreserved vehicle based on the license plate number recognized by the first license plate number recognizing device and the information pre-stored in the database device, and the priority of the vehicle may be then classified.

In addition, in the classifying of the priority of the vehicle and the distinguishing of whether the vehicle is the parking use vehicle or the charging use vehicle based on the recognized license plate number, when the vehicle is the charging use vehicle, it may be distinguished whether the charging use vehicle is the fast charging use vehicle or the slow charging use vehicle.

Meanwhile, the parking guidance method using a parking guidance system of a parking lot provided with a charging device for a vehicle may further include, after the providing of the guidance on the position of the assigned parking spot or charging spot to the vehicle until the vehicle arrives at the position of the assigned parking spot or charging spot, recognizing the license plate number by the second license plate number recognizing device; and comparing the license plate number recognized by the second license plate number recognizing device with the license plate number recognized by the first license plate number recognizing device, and moving the parking prevention jaw downward to enable the vehicle to be parked when the license plate numbers coincide with each other and allow the parking prevention jaw to be maintained in a state where the parking prevention jaw protrudes upward based on the ground when the license plate numbers do not coincide with each other.

In the determining of the parking fee or the charging fee of the vehicle and the processing of the payment of the parking fee or the charging fee when the vehicle exits the parking lot, when a preset time elapses after charging of the vehicle is completed, a separate parking fee may be determined and payment of the separate parking fee may be processed when the vehicle exits the parking lot.

The parking guidance method using a parking guidance system of a parking lot provided with a charging device for a vehicle may further include, before the recognizing of the license plate number by the first license plate number recognizing device when the vehicle enters the parking lot, processing the parking or charging service reservation based on the reservation information input from the user terminal.

In the processing of the parking or charging service reservation based on the reservation information input from the user terminal, when the reservation information and the card information for processing the payment of the deposit for the use of the parking or charging service is input from the user terminal, the reservation completion processing may be performed.

Meanwhile, the parking guidance method using a parking guidance system of a parking lot provided with a charging device for a vehicle may further include performing processing so that the deposit is paid by the card information input to the reserving device when a reserved vehicle is not recognized by the first license plate number recognizing device for a preset time based on a use reserved time of a reserved service date.

Detailed technical features in each step of the parking guidance method using a parking guidance system of a parking lot provided with a charging device for a vehicle described above are the same as technical features of detailed components in the parking guidance system of a parking lot provided with a charging device for a vehicle described above, and a detailed description therefor is thus omitted.

According to the present disclosure, by assigning a remaining parking spot or charging spot when a vehicle enters a parking lot provided with charging devices for a vehicle in a predetermined ratio or more among parking spots of the parking lot and providing a guidance on a path to the assigned parking spot or charging spot, a driver may more easily use a parking or charging service.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A parking guidance system of a parking lot provided with a charging device for a vehicle, comprising:
   a first license plate number recognizing device configured to recognize a first license plate number of a vehicle entering or exiting from the parking lot; and
   a server configured to:
   classify a priority of the vehicle and distinguish whether the vehicle is a parking use vehicle or a charging use vehicle based on the first license plate number,
   assign a parking spot or a charging spot to the vehicle based on at least one of information on the classified priority, information on whether the vehicle is the parking use vehicle or the charging use vehicle, or information on remaining parking spots and remaining charging spots, provide a guidance on a position of the assigned parking spot or charging spot to the vehicle until the vehicle arrives at the position of the assigned parking spot or charging spot, and determine a parking fee or a charging fee of the vehicle and to provide a guidance on the parking fee or the charging fee when the vehicle exits the parking lot, wherein the server includes:

a database device configured to store parking/charging service use reserved vehicle information, regular parked vehicle information, and information on whether the charging use vehicle is a fast charging use vehicle or a slow charging use vehicle; and a priority classifying device configured to decide whether the vehicle is a regular parked vehicle, a parking/charging service use reserved vehicle, or a parking/charging service use unreserved vehicle based on the first license plate number and the information stored in the database device, and to classify the priority of the vehicle.

2. The parking guidance system of claim 1, wherein the server further includes at least one of:

a parking/charging use distinguishing device configured to distinguish whether the vehicle is the parking use vehicle or the charging use vehicle based on the first license plate number and the information stored in the database device, and to distinguish whether the charging use vehicle is the fast charging use vehicle or the slow charging use vehicle when the vehicle is the charging use vehicle;

a path guiding device configured to assign the parking spot or the charging spot to the vehicle based on the priority of the vehicle and information distinguished by the parking/charging use distinguishing device, and to provide a guidance on a path to the vehicle until the vehicle arrives at the assigned spot;

a payment device configured to determine the parking fee or the charging fee of the vehicle and to process payment of the parking fee or the charging fee;

a charging completion guiding device configured to provide a guidance on whether or not charging of the vehicle is completed to a user terminal; or a reserving device configured to process a parking or charging service reservation based on reservation information input from the user terminal.

3. The parking guidance system of claim 2, further comprising one or more displays displaying a path of the vehicle to the assigned parking spot or charging spot, wherein the path guiding device transfers information on the path of the vehicle to the assigned parking spot or charging spot to the one or more displays to allow the information on the path to be displayed on the one or more displays.

4. The parking guidance system of claim 2, wherein when a preset time elapses after the charging of the vehicle is completed, the payment device determines a separate parking fee and processes payment of the separate parking fee when the vehicle exits the parking lot.

5. The parking guidance system of claim 2, wherein the reserving device performs reservation completion processing when the reservation information and card information for processing payment of a deposit for use of a parking or charging service is input from the user terminal.

6. The parking guidance system of claim 5, wherein the reservation information includes a use date of the parking or charging service, a use time of the parking or charging service, and a license plate number.

7. The parking guidance system of claim 6, wherein the payment device performs processing so that the deposit is paid by the card information input to the reserving device when a reserved vehicle is not recognized by the first license plate number recognizing device for a preset time based on a use reserved time of a reserved service date.

8. The parking guidance system of claim 1, further comprising a charging device installed in a partial space of the parking slot, wherein the charging device includes:

a parking prevention jaw including a charging device, movable upward or downward, protruding upward based on a ground to disable the vehicle from being parked at the time of moving upward, and being positioned below the ground to enable the vehicle to be parked at the time of moving downward;

a second license plate number recognizing device provided in the parking prevention jaw and recognizing a second license plate number; and a controller configured to:

compare the second license plate number with the first license plate number, move the parking prevention jaw downward to enable the vehicle to be parked when the first and second license plate numbers coincide with each other, and allow the parking prevention jaw to be maintained in a state where the parking prevention jaw protrudes upward based on the ground when the first and second license plate numbers do not coincide with each other.

9. A parking guidance method using a parking guidance system of a parking lot provided with a charging device for a vehicle, comprising steps of:

recognizing a first license plate number by a first license plate number recognizing device when the vehicle enters the parking lot;

classifying a priority of the vehicle and distinguishing whether the vehicle is a parking use vehicle or a charging use vehicle based on the first license plate number;

assigning a parking spot or a charging spot to the vehicle based on at least one of information on the classified priority, information on whether the vehicle is the parking use vehicle or the charging use vehicle, or information on remaining parking spots and remaining charging spots;

providing a guidance on a position of the assigned parking spot or charging spot to the vehicle until the vehicle arrives at the position of the assigned parking spot or charging spot; and determining a parking fee or a charging fee of the vehicle and processing payment of the parking fee or the charging fee when the vehicle exits the parking lot, wherein the step of classifying includes deciding whether the vehicle is a regular parked vehicle, a parking/charging service use reserved vehicle, or a parking/charging service use unreserved vehicle based on the first license plate number, and classifying the priority of the vehicle; and distinguishing whether the charging use vehicle is a fast charging use vehicle or a slow charging use vehicle when the vehicle is the charging use vehicle.

10. The parking guidance method of claim 9, further comprising, after the step of providing, recognizing a second license plate number by a second license plate number recognizing device;

comparing the second license plate number with the first license plate number;

moving a parking prevention jaw downward to enable the vehicle to be parked when the first and second license plate numbers coincide with each other; and allowing the parking prevention jaw to be maintained in a state where the parking prevention jaw protrudes upward based on a ground when the first and second license plate numbers do not coincide with each other.

11. The parking guidance method of claim 9, wherein the step of determining includes determining a separate parking fee and processing payment of the separate parking fee when the vehicle exits the parking lot when a preset time elapses after charging of the vehicle is completed.

12. The parking guidance method of claim 9, further comprising, before the step of recognizing, processing a parking or charging service reservation based on reservation information input from a user terminal.

13. The parking guidance method of claim 12, wherein the processing a parking or charging service reservation based on the reservation information input from a user terminal includes performing reservation completion processing when the reservation information and card information for processing payment of a deposit for use of a parking or charging service is input from the user terminal.

14. The parking guidance method of claim 9, further comprising performing processing so that a deposit is paid by card information input to a reserving device when a reserved vehicle is not recognized by the first license plate number recognizing device for a preset time based on a use reserved time of a reserved service date.

* * * * *